Dec. 18, 1962 O. E. DE LANGE 3,069,564

SIGNAL TRANSLATING CIRCUITS EMPLOYING TWO-TERMINAL NEGATIVE RESISTANCE DEVICES

Filed Dec. 31, 1959 2 Sheets-Sheet 1

INVENTOR
O. E. DE LANGE
BY E. J. Ohlsuden
ATTORNEY

INVENTOR
O. E. DE LANGE
BY E. J. Rinder
ATTORNEY

1

3,069,564

SIGNAL TRANSLATING CIRCUITS EMPLOYING TWO-TERMINAL NEGATIVE RESISTANCE DEVICES

Owen E. De Lange, Rumson, N.J., assignor to Bell Telephone Laboratories, Incorporated, New York, N.Y., a corporation of New York Filed Dec. 31, 1959, Ser. No. 863,301
6 Claims. (Cl. 307—88.5)

This invention relates to signal translating circuits and, more specifically, to logic circuits employing negative-resistance, voltage-controlled, crystal diodes.

Improvements in translating and logic circuits, particularly those employed in computing equipment, have heretofore been severely limited by the lack of devices with suitable properties of operating speed and versatility of function. For example, even though conventional solid state switching devices have operate times which are orders of magnitude less than mechanical relays and vacuum tubes, these devices still impose undesirable limitations on the capabilities of computing equipment. Additionally, the combination of a number of translating and logic circuits normally leads to a need for amplification to compensate for the attenuation losses to which the signal pulses are subject. Conventional means of pulse amplification generally require the employment of circuit devices in addition to those used to perform the logic and translating functions, and this requirement is conducive to undesirable increases in both the cost and complexity of computer circuitry. Additionally, conventional amplifying arrangements tend to limit the speed of operation of the circuits in which they are employed.

A partial solution to some of these problems is indicated by the recent development of two-terminal, voltage-controlled, negative-resistance devices with switching speeds of the order of $10^{-11}$ seconds, or one one-hundred-thousandth of a microsecond. In addition to providing switching speeds which are several orders of magnitude greater than that of conventional diodes, such devices afford the amplification which is characteristic of a translating device or circuit which includes negative resistance.

Although the potential versatility of high-speed, voltage-controlled, negative-resistance devices is now generally recognized by persons skilled in the art, specific circuitry designed to exploit fully the characteristics noted has been lacking heretofore. For example, in circuits with multiple inputs there is a need for simple arrangements which afford maximum isolation or minimum mutual interference between inputs. Further, there is a need for effective yet simple isolation of the diodes of one circuit from the diodes of interacting or responsive circuits while still turning to account the amplification characteristics of the individual devices. And still further, there is a need for circuit arrangements that afford increased amplification, such as that provided by combinations of negative-resistance, crystal diodes, without the disadvantage of increased input power requirements that are conventionally associated therewith.

One general object of the invention, therefore, is to provide improvements to diode logic circuitry.

A specific object of the invention is to provide circuits which meet the needs described above.

These and other objects are attained in accordance with the principles of the invention in various illustrative embodiments each employing one or more combinations of two or more diodes in series relation, each diode having a current-voltage characteristic which includes a region of negative resistance bounded by a first and a second region of positive resistance.

2

The principles of the invention are based, in part, on the realization that a series combination of voltage-controlled, negative-resistance diodes, having characteristics as described above, may be employed to advantage in combination with various impedance elements and bias sources in a variety of circuit connections to perform either logic or signal translating functions.

In one specific illustrative embodiment of the invention two series pairs of negative-resistance diodes are employed in a four-terminal signal translating circuit. An input signal is applied across the first pair of diodes which is of sufficient magnitude to drive both diodes simultaneously from their low voltage state to their high voltage state. The impedance of the input circuit is made sufficiently high in comparison to the diodes that the input voltage required to switch the two diodes is only insignificantly greater than would be required to switch a single diode, while the power output of the two diodes is of course twice that from only one. The output across the two input diodes is then applied across a second series pair of diodes in parallel relation to the first pair. Isolation between the two diode pairs is achieved by a relatively high magnitude resistor and a capacitor and hence, in accordance with the principles of the invention, the two diodes of the second pair may be employed advantageously to obtain a second double amplification. Adjustable bias means completes the circuit.

In a second embodiment of the invention the same principles are employed in a circuit with dual inputs, each being applied across a respective one of the diodes in a first diode series pair. High impedance isolation between the first diode pair and a second diode pair is attained by a reverse biased conventional diode. This circuit performs as an AND gate or an OR gate while also providing amplification.

In still another embodiment of the invention a single high-speed, voltage-controlled, negative-resistance diode is employed in an output circuit, and suitable high impedance isolation from a series diode pair in the input circuit is provided by a transformer. This circuit also employs dual input signals, each of which is applied across a respective one of the diodes in the series diode pair, and, accordingly, performs as an AND gate, an OR gate, or, with a simple modification, as an INHIBIT gate. Again, amplification is provided in both the input and output branches of the circuit by virtue of the negative resistance characteristics of the diodes.

Accordingly, one feature of the invention is the employment of two pairs of series connected, high-speed, negative-resistance, voltage-controlled diodes in a signal translating circuit so arranged as to provide maximum signal amplification.

A further feature of the invention is the employment of a pair of series connected diodes of the type described in an AND gate logic circuit with provisions for the application of each of two input signals across a respective one of the diodes and for the generation of an output signal across both of the diodes.

Another feature of the invention is the employment of relatively high impedance devices as isolating elements in a signal translating circuit which includes one or more pairs of series connected diodes of the type described.

The principles of the invention, together with additional objects and features thereof, will be fully apprehended by considering the following detailed description and accompanying drawing in which.

Figure 3A:
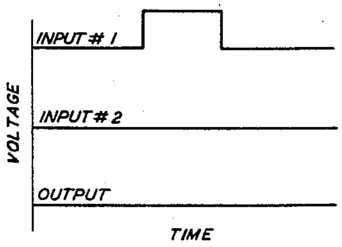
Figure 3B:
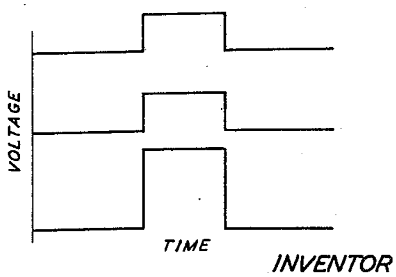
Figure 4:
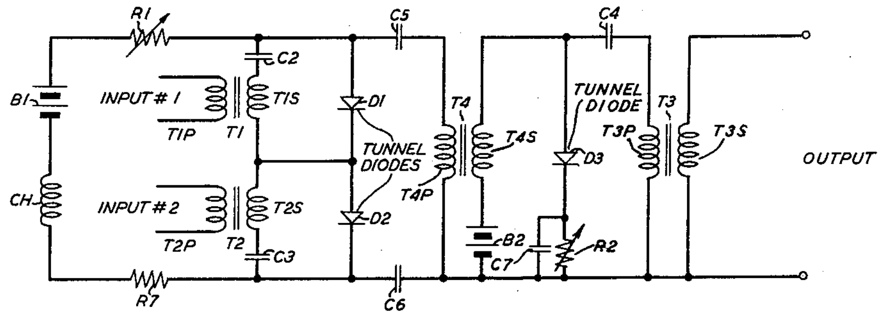
Figure 4A:
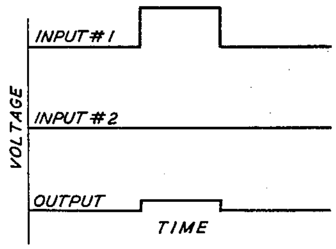
Figure 4B:
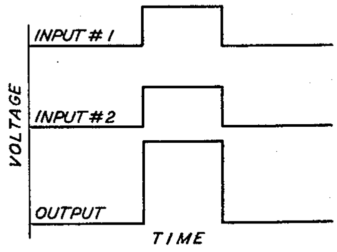

FIG. 3 is a schematic diagram of a logic circuit in accordance with the principles of the invention, and FIGS. 3A and 3B are time-voltage plots illustrating the operating characteristics of the circuits shown in FIG. 3; and FIG. 4 is a schematic diagram of a modification of the circuit shown in FIG. 3, and FIGS. 4A and 4B are time-voltage plots illustrating the operating characteristics of the circuit shown in FIG. 4.

Prior to a detailed consideration of the various embodiments of the invention, it will be helpful to examine briefly the operating principles and characteristics of a voltage-controlled, negative-resistance, crystal diode. One typical device of this type is commonly termed an Esaki or tunnel diode and is formed from a wafer of n-type germanium. An alloying process is employed to deposit a relatively small bead or mesa of metal on one face of the germanium wafer, and an extremely narrow p-n junction is formed between the mesa and the body of the wafer.

Figure 1:
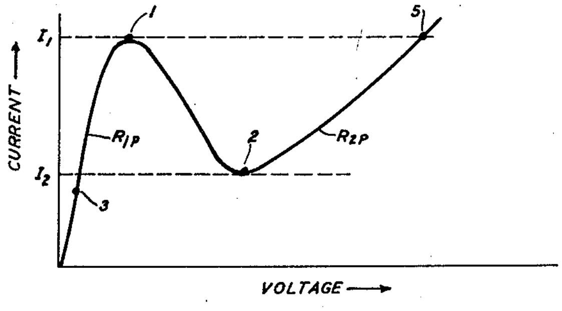
FIG. 1 is a current-voltage plot of a high-speed, negative-resistance, voltage-controlled diode.

FIG. 1 shows an illustrative current-voltage plot of the operating characteristics of a tunnel diode. The region of negative resistance $R_N$ which terminates at the point of maximum current 1 and minimum current 2 is bounded by the positive resistance regions $R_{1P}$ and $R_{2P}$. It is apparent that each particular voltage magnitude has a single corresponding current magnitude while certain current magnitudes correspond to any one of three voltages. The flow of current in the forward direction and the accompanying rapidity with which the device may be switched from the first to the second region of positive resistance are attributable in part to the high field intensity associated with narrow p-n junctions and the high concentration of diode impurity atoms. These conditions produce an apparent penetration or "tunneling" action of relatively low energy carriers through the relatively high energy barrier which exists at the p-n junction. In terms of the theory of quantum mechanics, it is known that there is always a calculable probability of finding such behavior within a restricted voltage interval. The narrower the diode junction, and the greater its impurity concentration, the higher the probability of barrier penetration. The substantially slower action of conventional p-n junction devices is of course attributable to the fact that little or no "tunneling" takes place, the movement of carriers across the junction being explained primarily in terms of drift and diffusion phenomena. A more detailed explanation of the theory of operation of tunnel diodes is presented by Leo Esaki in the Physical Review, 1958, vol. 109, page 603.

Figure 2:
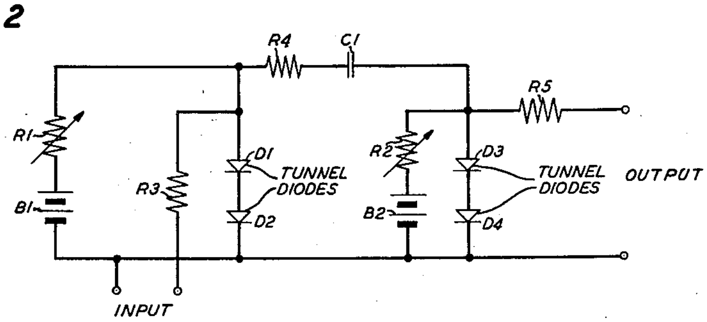
FIG. 2 is a schematic diagram of a signal translating circuit in accordance with the principles of the invention.
Figure 2:
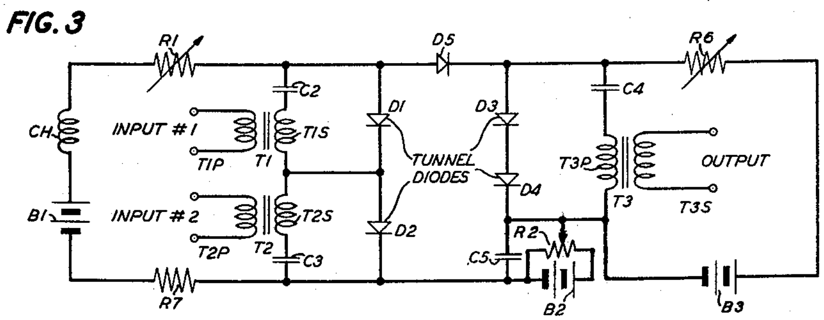

Turning now to FIG. 2, the circuit shown is an embodiment of certain principles of the invention and serves to illustrate in particular how a series combination of two tunnel diodes may be employed to drive a similar circuit. Instances of the need for driving one circuit with the output of another are of course well known to persons skilled in the art, and the employment of the output of one logic circuit to drive another similar circuit is a typical example.

The circuit of FIG. 2 includes a first pair of tunnel diodes D1, D2 similarly poled in series relation and a second similar pair of tunnel diodes D3, D4. The bias point of the diodes of the first pair is established by the steady voltage source B1 and the variable resistor R1 which are connected across the diode pair. Similarly, the bias point of the second pair of diodes D3 and D4 is established by the steady voltage source B2 and the variable resistor R2. Isolation between the two pairs of diodes is provided advantageously by the resistor R4 and the coupling capacitor C1. Input to the circuit, characteristically comprising pulses, is applied as shown across both of the diodes D1 and D2 by way of the resistor R3. Final circuit output, as contrasted with the output from across diodes D1 and D2, which may be termed an intermediate output, is taken from across the diodes D3 and D4 and is applied to a succeeding circuit or utilization device, not shown, through an isolating resistor R5.

In circuits of the general type described above, i.e., diode logic circuits, some degree of isolation between the diodes of each circuit branch and adjacent or interacting circuit branches is highly desirable in order to prevent mutual interference. In accordance with the principles of the invention, such isolation is advantageously attained between the pulse input circuit, not shown, and the first diode pair by means of the single resistor R3.

It would appear, in the light of conventional principles of circuit design, that the employment of a pair of diodes across the input points, as compared to the use of a single diode, might well raise the input impedance to a level that would preclude firing both diodes with the input signal. In other words, it would appear that the two diodes in series would require twice as much input voltage to fire as would be required by one diode alone. As stated above, however, the principles of the invention call for an isolating resistor and the magnitude of this resistor is selected to be substantially greater than the forward impedance of a tunnel diode. Accordingly, the employment of two diodes in series increases the total resistance but very little, and the additional increment of voltage required to fire both diodes as compared to the voltage required to fire a single diode is only negligible. By using both of the diodes D1 and D2, approximately twice as much voltage is developed across the resistor R4 as would be developed by the diode D1 alone. Accordingly, nearly twice as much current flows through the resistor R4, and hence through the diodes D3 and D4 as would be produced by the diode D1 alone.

Substantially the same principles are followed in the employment of two diodes D3 and D4 in the output circuit. The magnitude of the resistor R4 is substantially greater than the forward impedance of either of the diodes D3 and D4, and hence a second double amplification of the input signal is achieved at the expense of only a relatively insignificant increase in the minimum acceptable level of input voltage.

With reference to the individual operating characteristics of the tunnel diodes in the circuit of FIG. 2, it is desirable that the diodes D1 and D2 be substantially identical since ideally, both should operate together in response to a proper input signal. Similarly, the characteristics of the diodes D3 and D4 should also be substantially identical. A suitable relationship between the relative impedances of the two diode pairs can readily be attained by setting their respective bias means at the proper level.

In the operation of the circuit of FIG. 2, it will be understood that the shift in diode operating points which is effected by the application of a pulse of the proper polarity and magnitude across either diode pair lasts only for the duration of the pulse, and at the termination of the pulse the operating points of the affected diodes shift back to the position determined by the fixed bias.

Although the operation of the circuit of FIG. 2 may be explained in terms of voltage changes, since a tunnel diode is a "voltage-controlled" device, certain aspects may be discussed more readily in terms of current. For example, upon the termination of a firing pulse, the affected tunnel diode may be returned to its initial operating point, such as point 3 in FIG. 1, only if the biasing current is less than $I_2$, since any bias current greater than $I_2$ provides a stable operating point in the positive resistance region $R_{2P}$ as well as in the region $R_{1P}$. In order to effect a change of state in the opposite direction, i.e., to shift the diode from the low to the high voltage condition, the operating pulse must supply enough current to make the total current magnitude greater than $I_1$, or, in other words, the pulse current must be at least as great as $I_1-I_2$. The driving pulse must then always shift the operating state to the point 5 or beyond. As the pulse amplitude decreases, the operating point may, in effect, slide down the slope $R_{2P}$ until the point 2 is reached. Any further reduction in current causes an abrupt shift back to the low voltage condition.

Proceeding next to FIG. 3, the circuit shown illustrates the application of the principles of the invention in a logic circuit which with suitable minor modifications may function as an AND gate, an OR gate, or an INHIBIT gate. Circuit elements serving functions corresponding to functions performed by circuit elements in FIG. 2 are similarly identified. The concept of providing isolation between the various circuit branches while at the same time achieving dual amplification by the employment of series pairs of tunnel diodes is turned to account by applying a first input signal across the diode D1 by means of the transformer T1 and a second input signal across the diode D2 by means of the transformer T2. A simultaneous input across both of the diodes D1 and D2 achieves the same result as the single input signal discussed in connection with the circuit of FIG. 2, i.e., both diodes shift simultaneously from the low to the high voltage state.

Before discussing the operation of the circuit of FIG. 3 in more detail, it will be helpful to identify the function and characteristics of certain of the circuit elements which are not found in the circuit of FIG. 2. Each of the transformer primary circuits T1P and T2P is connected to a respective input pulse source, not shown, and the impedance of each of the transformers T1 and T2, looking into its respective secondary circuit, is relatively high in comparison to the forward impedance of either of the diodes D1 or D2. Similarly, the impedance of the bias circuit, which includes the steady voltage source B1, the choke coil CH, the variable resistor R1, and the fixed resistor R7, is also high in comparison to the impedance of the diodes D1 and D2. Capacitors C2 through C4 are conventional blocking capacitors and prevent the direct-current bias across the diodes from being short circuited by the transformers T1, T2, and T3, respectively. The conventional diode D5 is biased in its reverse or non-conducting direction by the bias source B3 which is controlled by the variable resistor R6.

To operate the circuit as an AND gate, the reverse bias on the diode D5 is kept sufficiently high so that a single input pulse applied by transformer T1 across diode D1 is insufficient to cause diode D5 to conduct despite the amplification of the input pulse that is effected by the tunnel diode D1. The same situation attends in the event of the application of an input pulse across the diode D2 only, through the transformer T2. In the event of simultaneous inputs at each of the transformers T1 and T2, however, the combined voltage drop across the diodes D1 and D2 is sufficient to overcome the reverse bias on the conventional diode D5 and the resulting voltage difference is applied across the diodes D3 and D4, causing each to shift its operating point across its region of negative resistance for the duration of the input pulse.

Although the use of the conventional diode D5 affords substantially greater isolation between the diode pairs than is provided by the resistor R4 in the circuit of FIG. 2, its high impedance in relation to the diodes D3 and D4 of FIG. 3 serves the same purpose as the high impedance of resistor R4 in relation to the diode pair D3 and D4 of FIG. 2. With the employment of a relatively high impedance device such as the reverse biased diode D5, the addition of a second tunnel or amplifying diode in the output circuit increases the overall impedance by a relatively insignificant amount which provides assurance that both diodes in the output branch of the circuit will be fired upon the application of an intermediate output signal. Double amplification is achieved at the cost of only a very slight increase in the minimum required magnitude of the intermediate output signal.

A feature of particular significance in the circuit of FIG. 3 is the degree of isolation afforded between the two input circuits. The isolation of either input from the other may be better appreciated from the following consideration. Assume first that an input pulse of the proper polarity and magnitude is applied to input No. 1 across the transformer primary T1P. Practically all of the resultant current from the secondary T1S flows through the diode D1. Although a small amount of current flows through diode D2, the impedance of the bias circuit, which includes the isolating resistors R1 and R7, the coil CH, and the bias source B1, is sufficiently high in comparison to the impedance of the diode D1 that this current flow represents only a very small percentage of the total pulse current. The relatively small amount of current that flows through the diode D2 as the result of a pulse applied across the diode D1 produces a correspondingly small voltage across the diode D2. Accordingly, very little voltage is produced at input No. 2 by the application of a pulse at input No. 1.

The input and output voltage plots shown in FIG. 3A and in FIG. 3B illustrate the function of the circuit of FIG. 3 as an AND gate. In FIG. 3A, it is apparent that a single input produces no output, and in FIG. 3B the simultaneous application of the input pulses results in an amplified pulse at the secondary of the output transformer T3S. By simply reducing the magnitude of the reverse bias on the conventional diode D5, it is evident that the circuit will perform as an OR gate. Additionally, the circuit may readily be modified to perform as an INHIBIT gate. This application requires that the polarity of one of the diodes, D2 for example, be reversed and further that the inhibitor pulse, applied at input No. 2 for example, be of sufficient magnitude to switch the diode D2 to its high voltage condition. With an input pulse simultaneously applied at input No. 1, both of the diodes D1 and D2 are placed in the high voltage condition and, assuming similar diode characteristics, the total voltage across the two in tandem is very nearly zero since one is positive and the other negative. In the absence of an inhibitor pulse the INHIBIT gate arrangement behaves very much as though the diode D2 were short circuited since the reverse impedance of these devices is very low.

Proceeding next to FIG. 4, the circuit shown is a variant of the logic circuit of FIG. 3. Inasmuch as the circuit of FIG. 4 is in many respects similar to that of FIG. 3, consideration of the more significant differences between the two will be sufficient for a clear understanding of the function and operation of the circuit. Perhaps the most obvious change is in the output circuit where it will be noted that only a single diode D3 is employed. This arrangement is particularly suitable for applications in which the function of dual amplification in the output circuit is not of critical importance. While some amplification is afforded by virtue of the negative resistance characteristics of the diode D3, its function as a slicer or pulse shaper may in a particular application be of equal or greater significance.

The input side of the circuit, being substantially identical to the input side of the circuit of FIG. 3, requires no discussion since the function and operation of this arrangement has already been described.

In place of the diode coupling between the input and output branches employed in the circuit of FIG. 3, the circuit of FIG. 4 employs the transformer T4. Since the isolation afforded by the transformer is less complete than is provided by the conventional diode in the circuit of FIG. 3, a low level signal will occur at the output in response to a single input pulse, as shown in FIG. 4A. So long as this signal is insufficient in magnitude to exceed the threshold of the output device or circuit, not shown, the arrangement will perform satisfactorily as an AND gate. FIG. 4B illustrates the AND gate function with a full output signal which occurs in response to the coincident application of two input signals. In this instance the results are the same as attained by the circuit of FIG. 3 with the exception that the output signal is of lesser magnitude in comparison to the input signals.

The aspect of the invention which calls for isolation of inputs is illustrated equally well by FIG. 4 as by FIG. 3 although the employment of the transformer T4 calls for additional comment. In the event of the application of only a single input pulse, the current paths are as described for FIG. 3 with the exception that an additional current path is established by the primary of the transformer T4. By selecting a high value of impedance, looking into the primary circuit of the transformer T4, in comparison to the impedance of the diodes, the current through this path in the case of a single input signal is kept correspondingly small. The relatively high input impedance of the transformer T4 serves a dual purpose, in accordance with the principles of the invention, since it not only contributes to the isolation of the individual inputs, as explained, but its combination with the relatively high impedance of the other circuit elements ensures the delivery of approximately twice as much power to the diode D3 by the output across the diodes D1 and D2 as could be supplied by D1 or D2 alone.

The employment of the circuit of FIG. 4 as an OR gate or an INHIBIT gate may be effected in the same fashion as described for the circuit of FIG. 3.

It is to be understood that the circuitry described above is illustrative of the application of the principles of the invention. Numerous other arrangements may be designed by those skilled in the art without departing from the spirit and scope of the invention.

What is claimed is:

1. A signal translating circuit comprising, in combination, a pair of series-connected, similarly poled, asymmetrically conducting impedance devices each characterized by a current-voltage range which includes a region of negative resistance bounded by a first and a second region of positive resistance corresponding, respectively, to a low and a high voltage state, means for biasing each of said diodes in said low voltage state, input circuit means including a first relatively high impedance in relation to the impedance of said devices for driving both of said devices simultaneously from said low voltage to said high voltage state, whereupon an intermediate amplified signal is developed across both of said devices, at least one additional asymmetrically conducting impedance device characterized by properties substantially identical to those of said pair of devices, and similarly biased, in parallel circuit relation to said pair of devices, means including a second relatively high impedance, in relation to the impedance of said asymmetrically conducting impedance devices, for applying said intermediate amplified signal across said additional device, thereby to drive said additional device to its high voltage state, whereupon an amplified output signal is developed across said additional device, an output circuit, and means for applying said output signal to said output circuit.

2. Apparatus in accordance with claim 1 wherein each of said devices comprises a tunnel diode.

3. Apparatus in accordance with claim 1 wherein said input circuit includes two transformers with one winding of each shunting a respective one of said pair of asymmetrically conducting impedance devices.

4. A logic circuit comprising, in combination, a pair of tunnel diodes, similarly poled, in series relation, each characterized by a current-voltage range which includes a region of negative resistance bounded by a first and a second region of positive resistance corresponding respectively, to a low and a high voltage state, first input means for applying a first input signal across one of said diodes, second input means for applying a second input signal across the other of said diodes, means for biasing each of said diodes to a first preassigned point in said first positive resistance region, whereby, upon the simultaneous application of a first and a second input signal of suitable magnitude both of said diodes are driven to said high voltage state, whereupon an amplified intermediate signal is developed across said diode pair, at least one additional tunnel diode, in parallel relation to said pair of diodes, means for biasing said additional diode to a second preassigned point in said first positive resistance region, means including impedance, which is relatively high in relation to the impedance of said tunnel diodes, for applying said intermediate signal across said additional diode, whereby upon the application of said intermediate signal across said additional diode, an amplified output signal is developed across said additional diode, an output circuit, and means for applying said output signal to said output circuit.

5. A logic circuit comprising, in combination, a first pair of tunnel diodes in series relation, similarly poled, each characterized by a current-voltage range which includes a region of negative resistance bounded by a first and a second region of positive resistance, first input means including a first transformer for applying a first input signal across one of said diodes, second input means including a second transformer for applying a second input signal across the other of said diodes, means including resistance, a coil, and a steady voltage source connected across both of said diodes for biasing each of said diodes to a preassigned point in said first positive resistance region, whereby upon the coincident application of said first one and said second one of said input signals said diodes are driven, simultaneously, into said second region of positive resistance, thereby developing a first single output signal across said diodes, a second pair of series-connected, tunnel diodes in shunt relation with said first pair and having conduction characteristics substantially identical to said first pair, an output circuit, circuit means having an impedance which is relatively high in relation to said tunnel diodes for applying said first output signal across said second pair of diodes, thereby to drive both of the diodes of said second pair simultaneously from their first to their second regions of positive resistance, whereupon a second single output signal is developed across said second pair of diodes, and means including a transformer for applying said second output signal to said output circuit.

6. Apparatus in accordance with claim 5 wherein said means for applying said first output signal across said second pair of diodes includes an asymmetrically conducting impedance device and which further includes means applying a reverse bias potential to said asymmetrically conducting impedance device.

References Cited in the file of this patent

UNITED STATES PATENTS

| | | |
|---|---|---|
| 2,522,395 | Ohl | Sept. 12, 1950 |
| 2,585,571 | Mohr | Feb. 12, 1952 |
| 2,614,140 | Kreer | Oct. 14, 1952 |
| 2,966,599 | Haas | Dec. 27, 1960 |